(12) United States Patent
Schlemmer

(10) Patent No.: US 9,103,516 B2
(45) Date of Patent: Aug. 11, 2015

(54) LINING PART FOR A VEHICLE HAVING INTEGRATED LIGHT SOURCES

(75) Inventor: Christian Schlemmer, Landshut (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 120 days.

(21) Appl. No.: 13/885,369

(22) PCT Filed: Nov. 3, 2011

(86) PCT No.: PCT/EP2011/069305
§ 371 (c)(1),
(2), (4) Date: Jul. 30, 2013

(87) PCT Pub. No.: WO2012/065849
PCT Pub. Date: May 24, 2012

(65) Prior Publication Data
US 2013/0301287 A1   Nov. 14, 2013

(30) Foreign Application Priority Data

Nov. 16, 2010 (DE) .......................... 10 2010 043 960

(51) Int. Cl.
*B60Q 3/02* (2006.01)
*F21S 8/10* (2006.01)
*B60Q 3/04* (2006.01)
*B60R 13/02* (2006.01)

(52) U.S. Cl.
CPC ................. *F21S 48/00* (2013.01); *B60Q 3/044* (2013.01); *B60R 13/02* (2013.01); *F21S 48/2268* (2013.01); *B60Q 2500/10* (2013.01)

(58) Field of Classification Search
CPC . B60Q 2500/10; B60Q 3/002; F21S 48/1241; F21S 48/215; F21S 48/2268; G02B 6/0005
USPC .......................................... 362/488, 511, 551
See application file for complete search history.

(56) References Cited

U.S. PATENT DOCUMENTS

| 7,201,508 B2* | 4/2007 | Misaras .......................... 362/551 |
| 8,556,319 B2* | 10/2013 | Petouhoff et al. ............ 296/1.08 |
| 2002/0101738 A1 | 8/2002 | Misaras |
| 2004/0017687 A1 | 1/2004 | Misaras |
| 2005/0242607 A1 | 11/2005 | Neumann |
| 2005/0287890 A1 | 12/2005 | Herrmann et al. |
| 2008/0144333 A1* | 6/2008 | Gourlay ........................ 362/609 |

(Continued)

FOREIGN PATENT DOCUMENTS

| CN | 1768522 A | 5/2006 |
| DE | 100 46 982 C1 | 12/2001 |

(Continued)

OTHER PUBLICATIONS

Pollack, Herman W. Materials Science and Metallury. Fourth Edition, 1998 Paglierani, Gary. IT 283 Hardness Testing of Materials. 2005 Harness Testing of Materials.*

(Continued)

*Primary Examiner* — Peggy Neils
(74) *Attorney, Agent, or Firm* — Finnegan, Henderson, Farabow, Garrett & Dunner LLP

(57) ABSTRACT

A decorative part for use in vehicle interiors. The decorative part includes a haptic layer that is at least partially transparent; and a light source configured to feed light into the haptic layer.

15 Claims, 3 Drawing Sheets

(56) References Cited

U.S. PATENT DOCUMENTS

| | | | |
|---|---|---|---|
| 2008/0203755 A1* | 8/2008 | Bourgeois-Jacquet et al. | 296/97.5 |
| 2009/0129115 A1* | 5/2009 | Fine et al. | 362/606 |
| 2011/0033668 A1* | 2/2011 | Boelstler et al. | 428/161 |

FOREIGN PATENT DOCUMENTS

| | | |
|---|---|---|
| DE | 102 40 270 A1 | 3/2004 |
| DE | 10 2004 010 974 A1 | 10/2005 |
| DE | 10 2005 036 533 A1 | 2/2007 |
| DE | 10 2006 016 068 A1 | 10/2007 |
| DE | 10 2009 033 415 B3 | 7/2010 |
| DE | 10 2009 000 605 A1 | 8/2010 |
| EP | 1 609 680 A1 | 12/2005 |
| EP | 2145796 A2 | 1/2010 |
| EP | 2 208 645 A1 | 7/2010 |
| EP | 2 218 610 A1 | 8/2010 |
| FR | 2917697 A1 | 12/2008 |
| JP | S5130760 B1 | 9/1976 |

OTHER PUBLICATIONS

International Search Report of PCT/EP2011/069305 dated Feb. 6, 2012, and English translation of the International Preliminary Report on Patentability (21 pages).

Notification of the First Office Action, issued by the State Intellectual Property Office of the People's Republic of China, mailed Jan. 26, 2015, in Chinese Application No. 201180065164.7 (20 pages including translation).

* cited by examiner

LINING PART FOR A VEHICLE HAVING INTEGRATED LIGHT SOURCES

CROSS-REFERENCE TO RELATED APPLICATIONS

This is a U.S. National Phase of PCT/EP2011/069305, filed Nov. 3, 2011, which claims the benefit of priority to German Patent Application No. 102010043960.6, filed Nov. 16, 2010, which is incorporated herein by reference.

TECHNICAL FIELD

The invention relates to a decorative part for use in vehicle interiors, having at least one haptic layer and a light source.

BACKGROUND

For the backlighting of decorative elements, US 2004/0017687 A1 describes a decorative element that is designed for use in vehicle interiors and that can be backlit. In order to render the decorative element capable of being backlit, the decorative surface is perforated by means of a laser. The perforated decorative layer is provided on the rear side with an insulation/foam layer, which has an opening at the location of the backlighting. An LED is provided in the opening.

The necessity of having to omit the insulation/foam layer in the region of the backlighting has the result that, in that location, the decorative element does not have the haptic properties sought with the insulation/foam layer.

High-quality haptics and the ability to be backlit are each properties which determine the value of decorative parts. Unfortunately, it has not hitherto been possible to be able to optimise those properties independently of one another. Uniform haptics along the decoration is in fact impaired by the provision of light sources on the rear side of the decorative layer.

SUMMARY

It is an object of the invention to provide a backlightable decorative part having a haptic layer for vehicle interiors, the haptic quality of which decorative part is improved and/or can be adjusted more flexibly as compared with conventional backlightable decorative parts.

The object is achieved by a decorative part according to claim 1.

A decorative part within the scope of the invention is to be understood as being both a decorative part that is to be attached separately to a vehicle interior trim part, and a vehicle interior trim part that has a decorative area configured according to the invention, it also being possible for the decorative area to include virtually the whole of the surface of the vehicle interior trim part that is visible to the vehicle occupant.

Accordingly, the decorative part first comprises at least one haptic layer and a light source, the light source being so provided that it is able to feed light into the haptic layer. In other words, the light source can be provided, for example, on the rear side of the haptic layer, that is to say the side remote from the visible side of the decorative part, or laterally, it being necessary in the latter case for the haptic layer to have light-conducting properties and also light-scattering properties along the direction of extension of the layer, in order to emit the light to the front side of the decorative part. The front side is the side that is seen by the observer of the decorative part. Haptic layer means a layer that has a greater thickness compared to a film and greater softness compared to, for example, a rigid, dimensionally stable support for the decorative part, that is to say the haptic layer is pliable under pressure from the front side and further has a recovery property, as a result of which the haptic layer returns to its original state without the action of an external force. The haptic layer provides the decorative element with a soft or medium-hard surface quality.

According to the invention, the haptic layer is at least partly transparent, so that part of the light emitted by the light source passes through the haptic layer and thus backlights the decorative part. Owing to the transparency of the haptic layer, it is not necessary to provide an opening in the haptic layer for receiving a light source, so that the haptic properties of the decorative part are not affected by the light source. The two factors that influence the value of the decorative element, namely the haptics and the ability to be backlit, are decoupled to a certain degree in that manner. Because an opening is not provided in the haptic layer, an additional decorative layer for covering the opening and for covering the light source is not necessarily required, provided that the haptic layer has on the front side a surface that is suitable as a decoration. If, however, a decorative layer is provided, it is always lined with the haptic layer, even in the region of the light source. This results in new freedoms in terms of possible decorative materials, thicknesses of decoration, etc., because the decorative layer does not have to perform a stabilising function. Because it is not necessary to provide an opening that receives the light source, there is more uniform light distribution over the decoration, in so far as the haptic layer has uniform transparency, as compared with a case in which the light source is accommodated in an opening. In the latter case, the walls of the opening affect the light cone, which can become apparent as an unintentional intensity distribution of the light on the front side of the decorative element.

The haptic layer is preferably connected to a dimensionally stable support material on the rear side, the haptic layer being softer than the support material. The haptic layer and the support material can form a layer composite, the combination of the haptic layer and the support material determining the haptic properties of the decorative part. The pliability and recovery ability are determined by the haptic layer.

A dimensionally stable support part within the scope of the present invention is also understood as being so-called bend-resistant materials, as are used, for example, in German patent 10 2009 033 415 to form a storage compartment in the interior of a motor vehicle.

Preferably, the haptic layer has a light transmission of more than 50%, more preferably of more than 75%. The object of improved haptic properties is achieved with a light-transparent and soft-touch-like haptic layer. Particularly high value is achieved if a crystal-clear haptic layer is used, because such a haptic layer, depending on the structure of the haptic layer, has a minimal influence on the light emitted in the visible range.

Within the scope of the present invention, a crystal-clear haptic layer is understood as being a layer in which the material of which the layer is composed is crystal-clear, that is to say has a light transmission of preferably more than 85%. For example, in a fabric formed of monofilaments, the monofilaments are formed of a crystal-clear material. If, on the other hand, the haptic layer consists of a gel, for example, then the gel is crystal-clear.

Translucent, opaque and/or semi-transparent materials can, of course, also be used, if desired.

Preferably, the haptic layer has a thickness of from 0.2 mm to 40 mm, in order to provide perceptible pliability in the direction of the layer thickness with an adequate recovery ability. In this context, an ageing resistance in the range of from 90 to 120° C. is desirable with regard to high-quality interior fittings in the motor vehicle sector. Layer thicknesses of the haptic layer that are too great can adversely affect the recovery ability and in particular the permanent recovery ability. Furthermore, the pliability path in the thickness direction must be limited in order to ensure the homogeneity and durability of the decorative surface. A haptic layer that is too thin, on the other hand, does not ensure the desired impression of pliability. A haptic layer having a thickness of from 0.5 mm to 10 mm is particularly preferred.

The haptic layer preferably comprises a flexible polymer and/or a textile and/or a nonwoven and/or a foam, because the haptic properties of those material groups have proved themselves in motor vehicle construction. Use is made here of materials of acrylate such as, for example, PMMA, PC, TPU, SIK, PUR, polyurea, gels (also gel in gel with different degrees of hardness), such as silicone hydrogels, rubber, PVC, SAN crystal-clear, EPP, PMU (batched from TPU+PMMA), PS, COC, TPE, PP, polyester, resins (for example crystal-clear polyester resins), gel-like materials, gel-coat coatings, fluted materials, resilient crosslinked polymers (also of foamed consistency), mixtures of the above-mentioned materials or a combination in the form of layers of the above-mentioned materials, or in the form of integrated fillers (for example metal particles for light reflection, transparent powder, particles, crystals, spheres or embedded structures, such as lattice structures) or natural fibre and natural fibre composite materials. Flexible polymers are preferably used in order to produce a crystal-clear soft-touch layer. The transmission values of such a crystal-clear layer match the transmission values of a crystal-clear sheet. In the case of some polymers of a specific thickness, the crystal-clear transmission of a sheet of glass is readily achievable. In addition to the mentioned polymers, crystal-clear textiles, nonwovens as a monolayer/multilayer and/or in a composite with the above-mentioned materials are also suitable, in which the transmission values may be lower, depending on the structure of the material, owing to scattering of the coupled light. The following light transmission values can be achieved:

Glass, from 98% to 85% at thicknesses of from 3 mm to 19 mm

TPU, 88% at a thickness of 3 mm

PMMA, 98% at a thickness of 3 mm

Knitted spacing fabrics comprising two cover layers and pile yarns connecting them, more than 50% at a thickness of 3 mm In the case of polymers having a single- or multi-layer structure, the target transparency is from 98% to 75%.

In the case of fabrics or knitted fabrics, the transparency is limited by the fabric structure and the material of the monofilament of which the fabric and/or knitted fabric is composed. However, simply by using a crystal-clear monofilament to produce a knitted fabric, the transparency can be increased considerably (for example from about 25% in the case of conventional knitted spacing fabrics to more than 50% where transparent monofilaments are used, with an identical structure).

The material density of the haptic layer is preferably less than $1.15 \text{ kg/dm}^3$, in order to ensure sufficient pliability. More preferably, the material density is in the range of from 0.03 $\text{kg/dm}^3$ to $0.8 \text{ kg/dm}^3$. These values can readily be achieved in particular in the case of foams.

Preferred textiles or nonwovens have a weight per unit area of from 20 to 600 $\text{g/m}^2$.

The haptic layer preferably comprises light-conducting fibres, profiles, semi-finished products and/or mouldings in order to enable the optical properties of the haptic layer to be adjusted in a flexible manner. Light-conducting fibres can be woven into materials or chosen for the formation of the materials or used as a filler in foams, polymers, etc.

The haptic layer preferably has an opening which receives the light source, which opening does not, however, extend completely through the haptic layer in the thickness direction. This measure serves to create a decorative element that is compact in the thickness direction but nevertheless is provided with the ability to be backlit and with improved haptic properties as compared with the prior art. By means of the present invention, the haptic function can be detached from the ability to be backlit. The resulting freedom can be used to impart a uniform haptic quality or varying haptic impressions to the decorative part.

On the side remote from the rear side, that is to say on the decorative side of the haptic layer, there is preferably provided a decorative layer, which forms a layer composite with the haptic layer directly or by way of one further layer or a plurality of layers. The decorative layer can have a Shore A hardness in the range of from 10 to 90. The pleasing haptic quality of the decoration is not impaired despite its being able to be backlit. This is wholly surprising to the occupant of the vehicle, because in the prior art the incorporation of an ability to be backlit has an effect on the haptic quality of the decorative element.

It is possible for the thickness of part or a large area of both the decorative layer and the haptic layer to vary, in order purposively to adjust a haptic of the decorative element in some areas. However, the layer structure comprising the decorative layer and the haptic layer preferably has a constant thickness over a large area.

The decorative layer is preferably provided with a perforated area, whereby apertures are formed in the decorative layer. It is thereby ensured that non-transparent decorative layers are able to be backlit.

The perforation is preferably substantially invisible, the diameters of the apertures particularly preferably being in the range of from 0.01 mm to 0.1 mm. The decorative layer can be (partially) thinned out in the region of the perforation. The transparent haptic layer levels a thinned-out area. A perforation of that type is intended to create a homogeneous appearance of the decorative surface when the backlighting is not switched on. "Homogeneous" here does not necessarily mean only a smooth surface. Uneven, structured surfaces also play an important part for the present invention. The term "homogeneous" is instead intended to signify that treatment of the surface in order to permit backlighting, or transillumination, damages or affects the original surface structure as little as possible. For example, a leather layer that was not originally backlit should exhibit the typical character of leather when in the backlightable state even when the backlighting is not switched on, without being interspersed with disruptive, noticeable apertures. In addition to leather layers, which are to be found in particular in the premium vehicle segment, artificial leather or leather-like materials in particular are also suitable for the decorative layer.

The light source is preferably an LED, which, apart from its small size and advantageous useful life, is suitable for the present invention also on account of its low heat generation, because a small distance is conventionally to be maintained between the haptic layer and the light source, or the two components even have to be connected. For the same reason, light-emitting films, preferably an OLED film, or a light-emitting paint, are suitable.

The invention is suitable in particular for use in the centre console, the instrument panel, the inside door panel, in the case of exchangeable add-on parts (e.g. support pads) or storage areas in motor vehicles.

DESCRIPTION OF THE EMBODIMENTS

Figure 1:
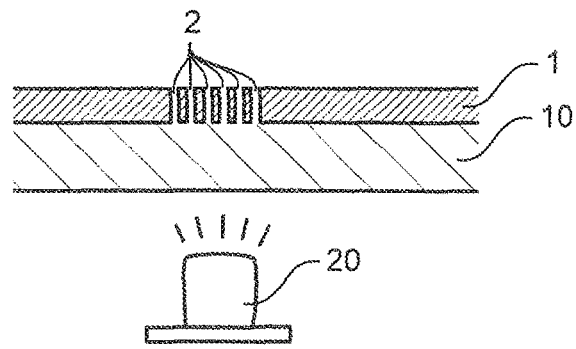
FIG. 1 is a section through a layer composite comprising a haptic layer and a decorative layer with a light source.

FIG. 1 shows a schematic section through a composite layer comprising a decorative layer 1 and a haptic layer 10. The decorative layer 1 is here assumed to be, for example, a partially perforated leather layer, into which apertures 2, which pass through the leather layer 1 completely, have been introduced. The totality of the apertures 2 forms a perforation, which is preferably homogeneous within the meaning defined above.

The haptic layer 10 is at least partially transparent and preferably consists of the materials or material combinations mentioned above. On the rear side of the haptic layer 10 there is arranged an LED 20, which emits light to the front side of the decorative element, that is to say to the side facing the observer. The light passes through the (partially) transparent haptic layer 10 and through the tiny apertures 2 of the perforation, giving the impression of a light-permeable leather layer.

Figure 2A:
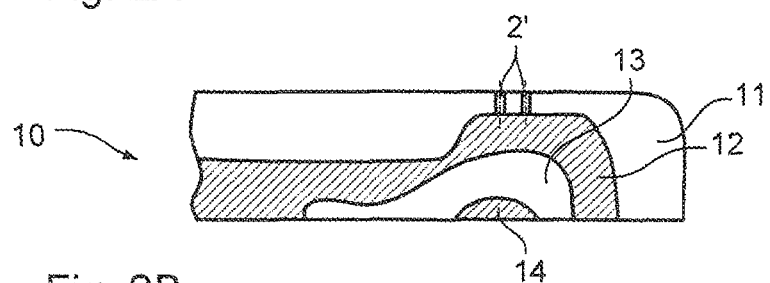
FIG. 2A is a section through a non-homogeneous haptic layer.
Figure 2B:
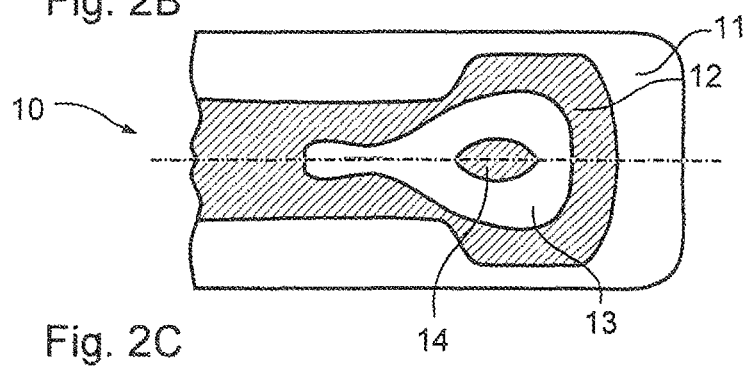
FIG. 2B is a top view of the non-homogeneous haptic layer of FIG. 2A.
Figure 2C:
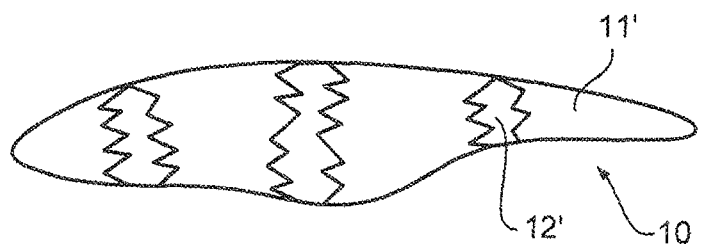
FIG. 2C shows an inhomogeneous haptic layer constructed as a shock absorber.

In the exemplary embodiment of FIG. 1, the haptic layer is shown in the form of a uniform layer, which ensures uniform haptic behaviour over the entire area shown. FIGS. 2A to 2C show that, by integrating a wide variety of materials, it is possible to form in the haptic layer haptic zones having different pliability and recovery behaviour.

FIG. 2A is a section through a haptic layer 10 having materials 11 to 14, which are preferably selected from the examples mentioned above. On the decorative side, the haptic layer is completed by a non-transparent material 11, which is provided with apertures 2'. The decorative layer 11 and the layers 12 to 14 connected thereto do not have to be flat layers but can partially enclose one another, have different thicknesses, etc., as long as the resulting haptic layer is suitable for use as the uppermost layer of the decorative element or as the lining of a decorative layer for a decorative element. As a result of the layers that have been applied and/or incorporated, zones of different haptics are produced, as is apparent from the top view of FIG. 2B. A "shock-absorber-like" configuration is shown in the sectional view of FIG. 2C, in which materials 11' and 12' have different hardnesses.

Figure 3A:
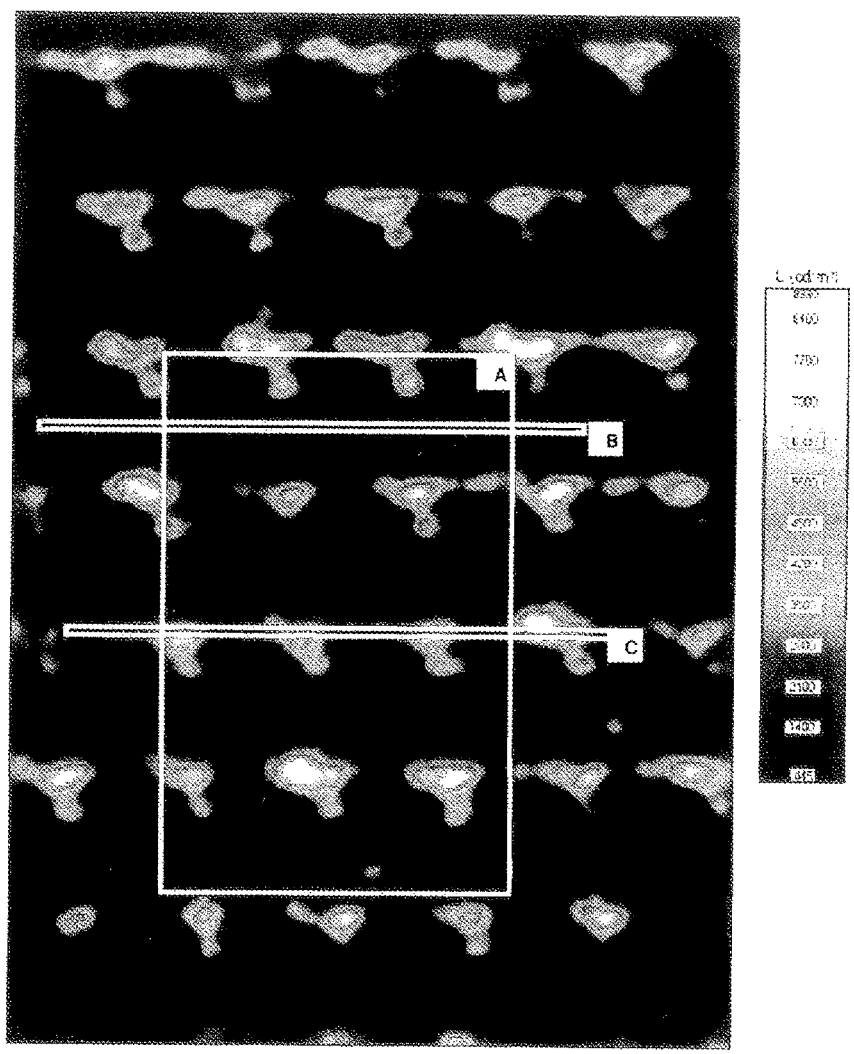
FIG. 3A shows a top view of a haptic layer in the form of a knitted spacing fabric which is composed of monofilaments of an opaque material and is backlit over the whole area.

FIG. 3A shows a top view of a haptic layer 10 in the form of a knitted spacing fabric. The knitted spacing fabric is formed of an opaque yarn and is backlit by means of a flat light source. Light areas denote areas with high light transmission, and darker areas correspondingly denote a lower light transmission. As is apparent, regular areas with a higher transmission are formed. This is the result in particular of the structure of the knitted spacing fabric, and here in particular of the structure of the cover layers. Measurements of the transmission behaviour give a transmission of only about 25% for a measuring field, or an area A, which is representative of the transmission behaviour of the knitted spacing fabric. In the areas with the greatest transmission, which in the present example is measured in area C, on the other hand, a transmission of about 50% is found. The transmission measured in area B is only 18%, because the passage of light is limited considerably here by accumulations of material.

Figure 3B:
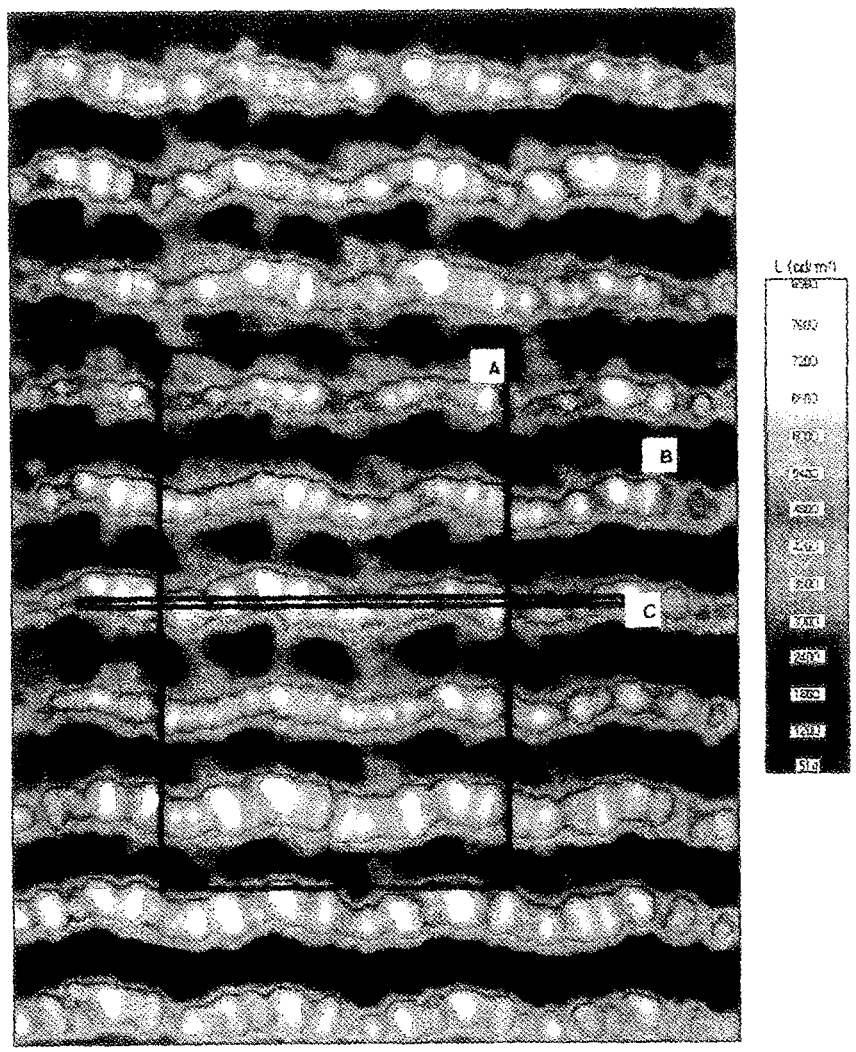
FIG. 3B shows a top view of a haptic layer of a knitted spacing fabric composed of monofilaments of a crystal-clear material, which haptic layer is backlit over the whole area.

FIG. 3B likewise shows a top view of a haptic layer 10 in the form of a knitted spacing fabric. In contrast to the material in FIG. 3A, there is used here a knitted spacing fabric that is formed of a crystal-clear monofilament but has a comparable structure. The transmission properties could be increased considerably by the choice of material, so that a transmission of more than 50% is now achieved for the haptic layer (represented by area A) and the transmission could be increased significantly both in area B, with more than 75%, and in area C, with more than 30%.

Further exemplary embodiments of the haptic layer relate to light-conducting fabric that is embedded or located at the surface, in combination with a soft-touch layer, or a frame (rigid, movable) covered with a yarn material or textile, the covering being flexible. The soft-touch layer can be produced as a composition of flexible, transparent extruded parts, semi-finished products, hoses with and without fabric reinforcement and the like. Moreover, for stabilisation purposes, bend-resistant elements can also be incorporated into the haptic layer or provided as a separate support part for connection to the haptic layer. When a partially transparent support part is used, the light source could also be arranged on the side of the support layer opposite the haptic layer.

What is claimed is:

1. A decorative part for use in vehicle interiors, comprising:
    at least one partially transparent haptic layer, the haptic layer being pliable under pressure from a front side and having a recovery property that returns the haptic layer to its original state without applying an external force;
    a decorative layer provided on the front side of the haptic layer remote from a rear side, wherein the decorative layer forms a layer composite with the haptic layer directly or by way of one or more further layers, and wherein the decorative layer is provided with a perforated area and apertures are formed in the decorative layer; and
    a light source configured to feed light into the haptic layer and through the apertures.

2. The decorative part according to claim 1, wherein:
    the haptic layer is connected to a dimensionally stable support material on a rear side of the haptic layer, and
    the haptic layer is softer than the support material.

3. The decorative part according to claim 1, wherein the haptic layer has a light transmission of more than about 50%.

4. The decorative part according to claim 3, wherein the haptic layer has a light transmission of more than 75%.

5. The decorative part according to claim 1, wherein the haptic layer is formed at least in some areas of a crystal-clear material.

6. The decorative part according to claim 1, wherein the haptic layer has a thickness of from 0.2 mm to 40 mm.

7. The decorative part according to claim 6, wherein the haptic layer has a thickness of from 0.5 mm to 10 mm.

8. The decorative part according to claim 1, wherein the haptic layer is produced from at least one of a flexible polymer, textiles, nonwovens, or a foam.

9. The decorative part according to claim 1, wherein the haptic layer comprises light-conducting fibres.

10. The decorative part according to claim 1, wherein the light source is introduced into an opening in the haptic layer.

11. The decorative part according to claim 1, wherein a haptic quality of the haptic layer varies along the haptic layer.

12. The decorative part according to claim 1, wherein diameters of the apertures are in the range of from 0.01 mm to 0.1 mm.

13. The decorative part according to claim 1, wherein the decorative layer includes leather, artificial leather, film, paper, or a leather-like material.

14. The decorative part according to claim 1, wherein the light source comprises an LED, a light-emitting film, an OLED film, or a light-emitting paint.

15. The decorative part according to claim 1, wherein the haptic layer and the light source are connected to one another.

* * * * *